United States Patent
Lube

(10) Patent No.: US 8,118,672 B2
(45) Date of Patent: Feb. 21, 2012

(54) ELECTRONIC CONSOLES HAVING FLEXIBLE DISPLAYS

(75) Inventor: Robert R. Lube, Countryside, IL (US)

(73) Assignee: Wells Gardner Electronics Corporation, McCook, IL (US)

(*) Notice: Subject to any disclaimer, the term of this patent is extended or adjusted under 35 U.S.C. 154(b) by 570 days.

(21) Appl. No.: 12/237,793

(22) Filed: Sep. 25, 2008

(65) Prior Publication Data

US 2009/0082103 A1    Mar. 26, 2009

Related U.S. Application Data

(60) Provisional application No. 60/975,106, filed on Sep. 25, 2007.

(51) Int. Cl.
*A63F 9/24* (2006.01)
(52) U.S. Cl. .......................................... 463/31
(58) Field of Classification Search ............... 463/31
See application file for complete search history.

(56) References Cited

U.S. PATENT DOCUMENTS

| | | | |
|---|---|---|---|
| 2006/0100013 A1 | 5/2006 | Enzminger | |
| 2006/0234792 A1* | 10/2006 | Walker et al. | 463/20 |
| 2007/0077984 A1* | 4/2007 | Aida et al. | 463/20 |
| 2007/0149281 A1 | 6/2007 | Gadda et al. | |

OTHER PUBLICATIONS

Search Report/Written Opinion corresponding to the PCT/US 08/77712 application.

* cited by examiner

*Primary Examiner* — Omkar Deodhar
(74) *Attorney, Agent, or Firm* — Clark Hill PC

(57) ABSTRACT

A gaming console configured with an auxiliary flexible display unit, e.g., a flexible LCD unit, providing different viewing angles for viewing displayed messages of advertisements is provided. The flexible display unit may comprise a plurality of individual flexible display modules which may be oriented as to define separate viewing windows or corridors to display related or unrelated messages, viewable from different directions. Corridors of viewing may be defined by software so that the flexible display unit may present messages uniquely to each defined corridor, which corresponds to one or more flexible display modules or portions thereof.

20 Claims, 15 Drawing Sheets

ELECTRONIC CONSOLES HAVING FLEXIBLE DISPLAYS

CROSS-REFERENCES TO RELATED APPLICATIONS

This application claims priority under 35 U.S.C. §119(e) to U.S. Provisional Application No. 60/975,106 filed Sep. 25, 2007, which is incorporated by reference herein, in its entirety.

BACKGROUND OF THE INVENTION

1. Field of the Invention

The invention relates generally to consoles, including gaming consoles and electronic kiosks, and more particularly to systems and methods for providing enhanced display assemblies employing flexible displays in consoles and kiosks.

2. Background of the Invention

Electronic consoles and kiosks (collectively, consoles) are primarily employed to mount and house video displays and house electronics associated with the video displays. Electronic consoles may be configured for one or more diverse purposes, including informational kiosks, automatic teller machines (ATM), vending kiosks such as for tickets sales, and gaming consoles for providing one or more wager-based games. Peripheral hardware may also be mounted on or in the console and associated with the video displays. Such peripheral hardware may include external buttons for registering user selections in response to, for example, prompts such as icons or words displayed on the video display. Peripherals may also include a touchscreen device overlaid on the video display to detect and register a user's selection of a prompt displayed on the video display.

With respect to gaming consoles in particular, electronic games offered in casinos and the like often include games of chance or wager-based games often provided via some form of platform such as a video machine or electronic console (generically, gaming console) implementing one or more specific types of games. Such games typically allow players to make a wager using actual currency or some equivalent form of value, e.g., coins, tokens or credit. Thereafter, the player may play the game implemented on the gaming console. To the extent the player wins, the gaming console may provide a payout of some value, such as by dispensing coins in a tray, a printed ticket that may be redeemed elsewhere, or credits on the gaming device or transferred to a machine-readable card.

Most modern gaming consoles employ computer-generated graphics and one or more types of games that are implemented, in part, by displaying graphics and/or text on a video display. These games may include any number of games of chance that are typically programmed, in part, to statistically payout winnings in a substantially random fashion, such as video slot machines or video poker for example. Typically, users interact with these gaming consoles using a touchscreen associated with the video display, or external buttons mounted to the console housing. FIG. 1A shows an exemplary gaming console according to the prior art. Gaming console 100 may broadly include a display device 105 for displaying the video, graphics and/or text associated with a wager-based game. The game console 100 may optionally include one or more of user input controls 110a-110c, an optional joystick (not shown) for interaction with a game, a token or money slot 120, a card reader 125 for reading a player's electronically-coded card for identification and/or payment, and a game lever 130 for initiating or interacting with a game. A payout dispenser 135, such as a coin tray, may also be present. The display 105 may also include a touch screen device associated with the video display 105 for entering of data or user selections.

Consoles, and particularly gaming consoles, often include a top box 150. Top box 150 may include area 138 that often features text and/or graphics to advertise what is being implemented on this console. Top box 150 generally includes a housing, and may be separate or integral with console 100 housing. Console 100 in FIG. 1A, being a gaming console 100, includes text to indicate the nature of the game implemented on console 100. Area 138 may be a rigid panel, and may be either opaque or translucent and backlit. Alternatively, area 138 may include a cathode ray tube (CRT) or flat panel video display to display video, graphics, and/or text relating to that which is being implemented on console 100. As shown in FIG. 1B, whether area 138 is a panel or a video display, each ordinarily permits viewing of area 138 within acute view angle Φ that is less than 180° and does not intersect a plane 141 that is coextensive and parallel to the face of area 138. Thus, to view and appreciate that which is displayed in or on area 138, a viewer must be oriented relative to top box 150 within view angle Φ such that the viewer can read or see what is displayed in area 138. A viewer positioned behind or to one side of top box 150 would be beyond view angle Φ and unable to view area 138.

In addition, consoles, and particularly gaming consoles such as console 100, lack visibility to a certain extent when placed in a casino or large room that may include large numbers of gaming consoles. It is common for gaming consoles to be arranged in rows in a casino, with some consoles being arranged in a back-to-back orientation with respect to a console in an adjacent row of consoles. In such situations, area 138 on console 100 may be unable to be seen unless a player is standing in the row of consoles, and further standing in view angle Φ of console 100 such that the player can view area 138 to determine the game being implemented on console 100. Thus, a player seeking to locate a gaming console implementing a particular game in a large room filled with similar consoles may be required to walk row after row of gaming consoles until the desired type of console is located.

Similar problems are associated with other types of consoles, such as ATMs or ticket and/or informational kiosks (kiosks). ATMs and kiosks are often located in stand-alone locations, or in small groups. Often, these stand-alone locations are in malls, train stations, airports, or other such locations having wide concourses, and installations that obscure the ATM or kiosk. A user may have difficulty locating the ATM or kiosk unless the user happens to view the top box area having an equivalent of area 138 when the user is proximate the ATM or kiosk and within view angle Φ corresponding to the respective ATM or kiosk.

Accordingly, there is a need to be able to expand the available options to provide better visibility of the console, ATM and/or kiosk. The present invention addresses these needs.

BRIEF SUMMARY OF THE INVENTION

The invention satisfies the foregoing needs and avoids the drawbacks and limitations of the prior art by providing an apparatus and methods for gaming consoles to provide advanced features in a gaming environment and to provide for a player to access other services.

According to an aspect of the present invention, a gaming console for implementing a wager-based game, includes a video display, a first flexible display unit, and electronics configured to implement one or more services and configured to provide a video display signal to the video display and a flexible display signal to the first flexible display unit, where the first flexible display unit has a curved display surface for displaying an image in response to the received signal. The first flexible display unit may include a plurality of display modules. The plurality of display modules may independently receive the flexible display signal. The plurality of display modules also may receive the flexible display signal in coordination with each other. The plurality of display modules may facilitate the viewing of a displayed message from substantially different viewing directions. The electronics may also include a computer to produce the video display signal and the flexible display signal to transmit the flexible display signal to the flexible display unit and the video display signal to the video display. The computer may be in communication with a server to receive content for display on at least one of the video display and the first flexible display unit. The first flexible display unit may receive the signal from a server. The gaming console may also include a second flexible display unit and the second flexible display unit may be arranged adjacent to the first flexible display unit. The second flexible display unit may be located above the first flexible display unit. The first and second flexible display units may display a coordinated message. The flexible display unit may be substantially semi-circular in shape.

According to another aspect of the invention, a gaming console for implementing a wager-based game includes a gaming device having a video display and electronics configured to implement one or more wager-based games and a flexible display unit associated with the gaming device, where the flexible display unit comprises at least one flexible module having a curved surface for displaying content and for facilitating viewing from different directions. The flexible display unit may include at least one semi-circular display unit. The flexible display unit may comprise a substantially circular display unit. The flexible display unit may be oriented to be viewed from a direction substantially above the gaming console. The video display may receive a video display signal and the flexible display unity may receive a flexible display signal and both of the signals may be produced by a common processor.

According to another aspect of the invention, a method for displaying messages associated with a gaming console, where the gaming console has a video display, an associated flexible display unit, and electronics configured to implement one or more wager-based games and to produce signals to the video display and the flexible display unit, is provided where the flexible display unit has a curved surface for displaying content and for facilitating viewing from different angles. The method includes defining one or more corridors of view for displaying content on the flexible display unit, and displaying content on the one or more corridors of view, where the content includes one of information related to the gaming console or information related to operations unrelated to the gaming console. The step for defining may include defining a plurality of corridors of view. The step for displaying content may include displaying content on the plurality of corridors of view substantially simultaneously.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced. In the drawings.

DETAILED DESCRIPTION OF THE INVENTION

Figure 1A:
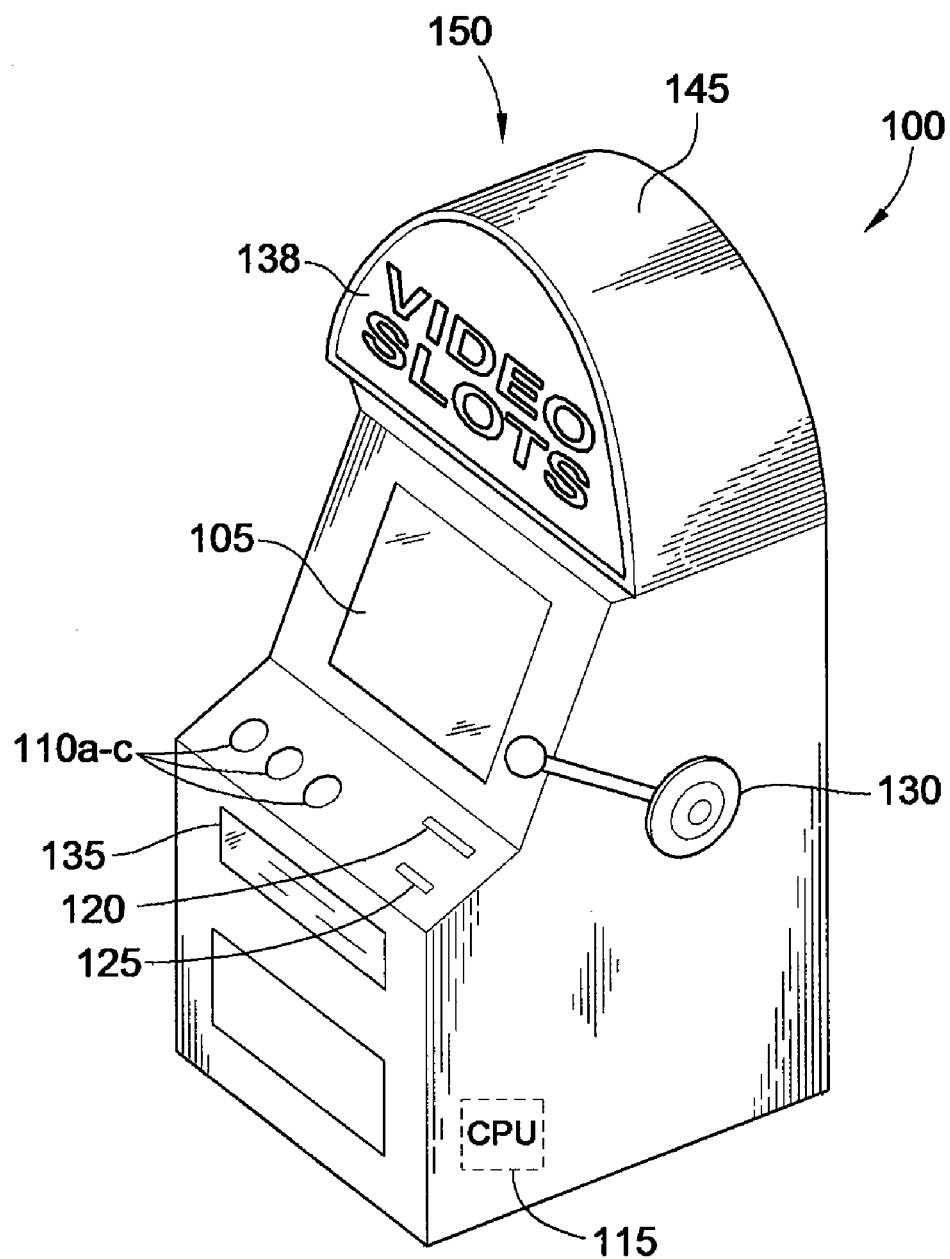
FIG. 1A is a perspective view of an exemplary gaming console according to the prior art.
Figure 1B:
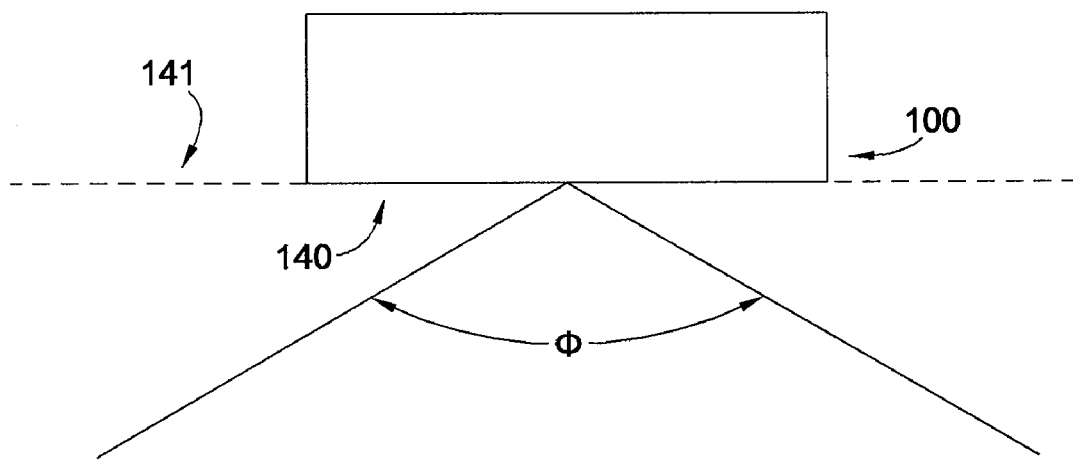
FIG. 1B is a top view of the prior art gaming console in FIG. 1A.

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings.

The apparatuses and methods of the invention may provide for enhanced visibility and/or user experience of consoles, ATMs and/or kiosks. Also, operators of consoles, ATMs, and/or kiosks may have additional options for presenting video, graphics, and/or text (collectively, graphics) to advertise or deliver information to users and/or observers.

Figure 1C:
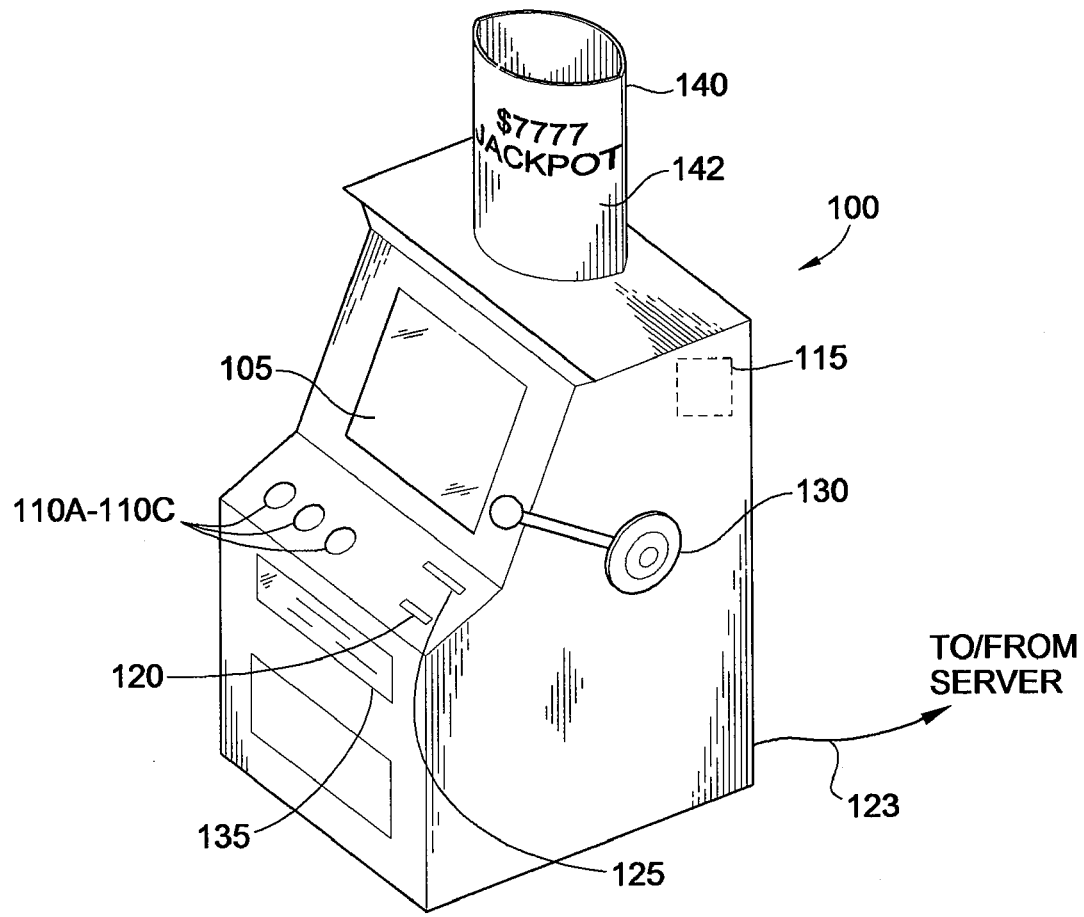
FIG. 1C is an illustration showing an exemplary gaming console with an associated flexible display unit, according to principles of the invention.

FIG. 1C is an illustration showing an exemplary gaming console, generally designated by reference numeral 100. Gaming console 100 includes a display device 105 and flexible display unit 140 for displaying graphics and other uses as described more fully below. The game console 100 may generally and optionally include one or more of the various peripheral features and/or a touchscreen device as previously described.

Gaming console 100 may also include audio input and output circuitry (not shown) to deliver audio for communications or game related sounds. Gaming console 100 may also be configured with appropriate network interfaces for linking the gaming consoles 100 to a casino's local area network.

Gaming console 100 is typically controlled by a microprocessor complex 115 with supporting electronic components to run the onboard software and to provide communications support with programs and servers running remotely. The software is generally related to the control, communications, and operation of the gaming console 100 and may be stored in read-only memory (ROM), erasable memory (EEPROM) or in volatile memory. Software may be further or alternately stored on a remote server across a network. A storage device such as a hard drive (not shown), for example, may also be employed for storing software and data.

The gaming console 100 and computer complex 115 is typically connected to a network 123 via a network interface card (not shown). The network 123 may comprise a local area network, wide area network, or a combination of networks including the Internet, and may be in bi-directional communication with a local and/or a remote server for obtaining downloads of software, game control logic, advertisements for display on the main display 105 or a top box display such as flexible display unit 140, general information for display, and/or diagnostic control software, and the like. Alternatively, gaming console 100 maybe connected by a wireless type technology.

Display 105 may be used for displaying and providing game visualization for console 100, such as video poker and video slots or the like, to the extent console 100 implements a wager-based game, and/or to provide other information. Display 105 may be any type of display suitable for presenting the desired video, graphics and/or text, such as CRT, liquid crystal display (LCD), field emission diode (FED), organic light emitting diode (OLED), or plasma. Display 105 is operatively connected to electronics within console 100 housing that provide a signal to display 105 for presentation thereon. During game play, the game visualization is typically and mostly presented on display 105, which the player may interact with via peripherals or a touch screen device as previously described.

A second display unit 140 maybe attached or mounted to console 100 (usually on or around a top portion of console 100) on which additional graphics may be displayed. Flexible display unit 140, in various embodiments discussed below, may include one or more flexible liquid crystal display (LCD) modules (or any other suitable flexible display) arranged in various configurations. Flexible LCD modules are available from various manufactures, including Samsung Corporation and Toshiba Corporation for example. Flexible displays are further available in different sizes and contour capabilities that permit a wide range of curvatures of the display panels, including up to 360 degrees of curvature. The flexible displays provide high contrast levels and wide ranges of colors with a high degree of viewability from a wide range of viewing angles.

A gaming console 100 typically has a computer complex 115 to control and manage the games being played thereon, sometimes in conjunction with a local or remote server application operatively accessible via the network 123. Computer complex 115 typically includes memory, input/output channels such as to communicate over a network to external servers for example, and electronics and interconnectivity to drive display 105 and flexible display unit 140. As described in more detail below, flexible display unit 140 may include one or more flexible display modules (e.g., module 160 of FIG. 4A) arranged and configured to be perceived as essentially one unit (when multiple modules are employed) and coordinated to provide viewers with graphics, which may include video, scrolling text and/or animation, which may further constitute general information, information specific to the game or service being implemented on console 100, or advertisements, and which can be viewed from multiple viewing angles. Flexible display module 160 is typically configured with a curvature by bending or flexing the display panel into a curved configuration, preferably up to the limits of flexibility of the specific type of flexible display modules employed. The coordination of the display 140 by the computer complex 115 may involve scrolling graphics, such as information 142, across the one or more LCD modules 140 so as to appear as a unified display, or as one display, when multiple LCD modules are employed.

Figure 3:
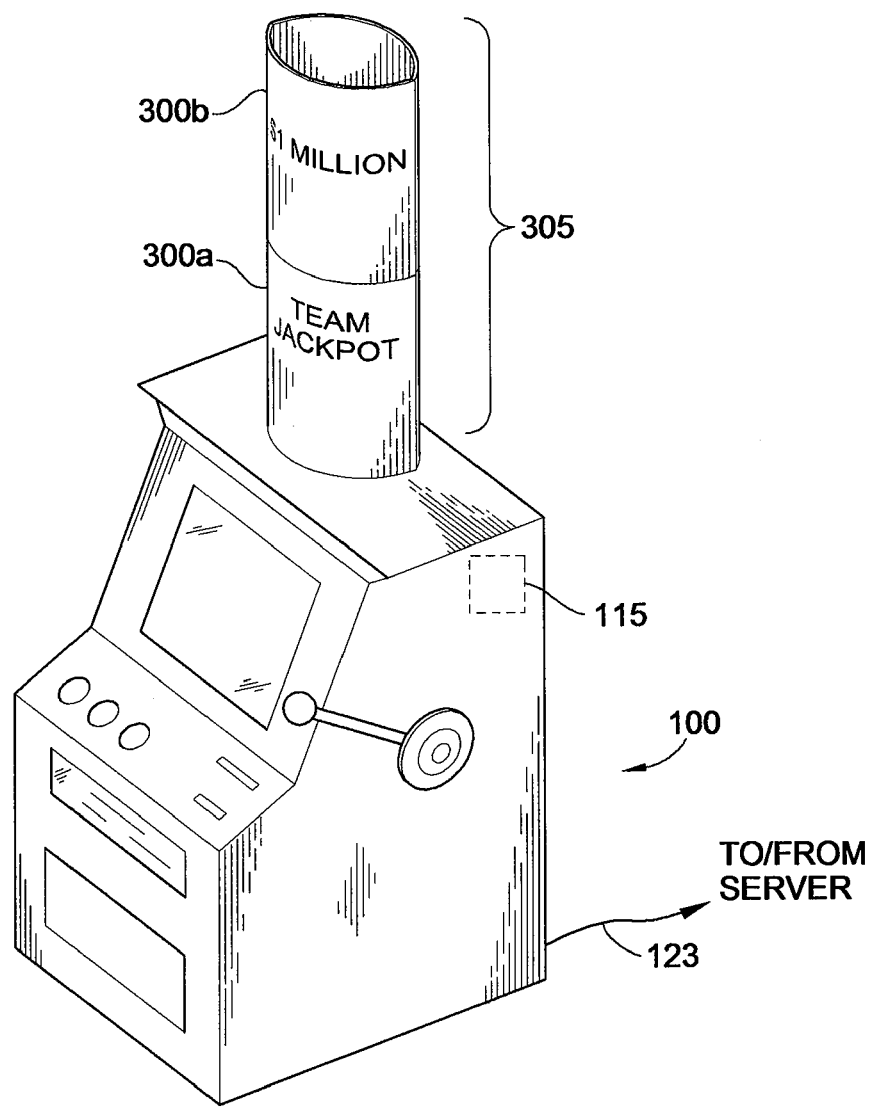
FIG. 3 is an illustration of an embodiment showing an exemplary gaming console with associated plurality of stacked auxiliary flexible display units, according to principles of the invention.
Figure 4A:
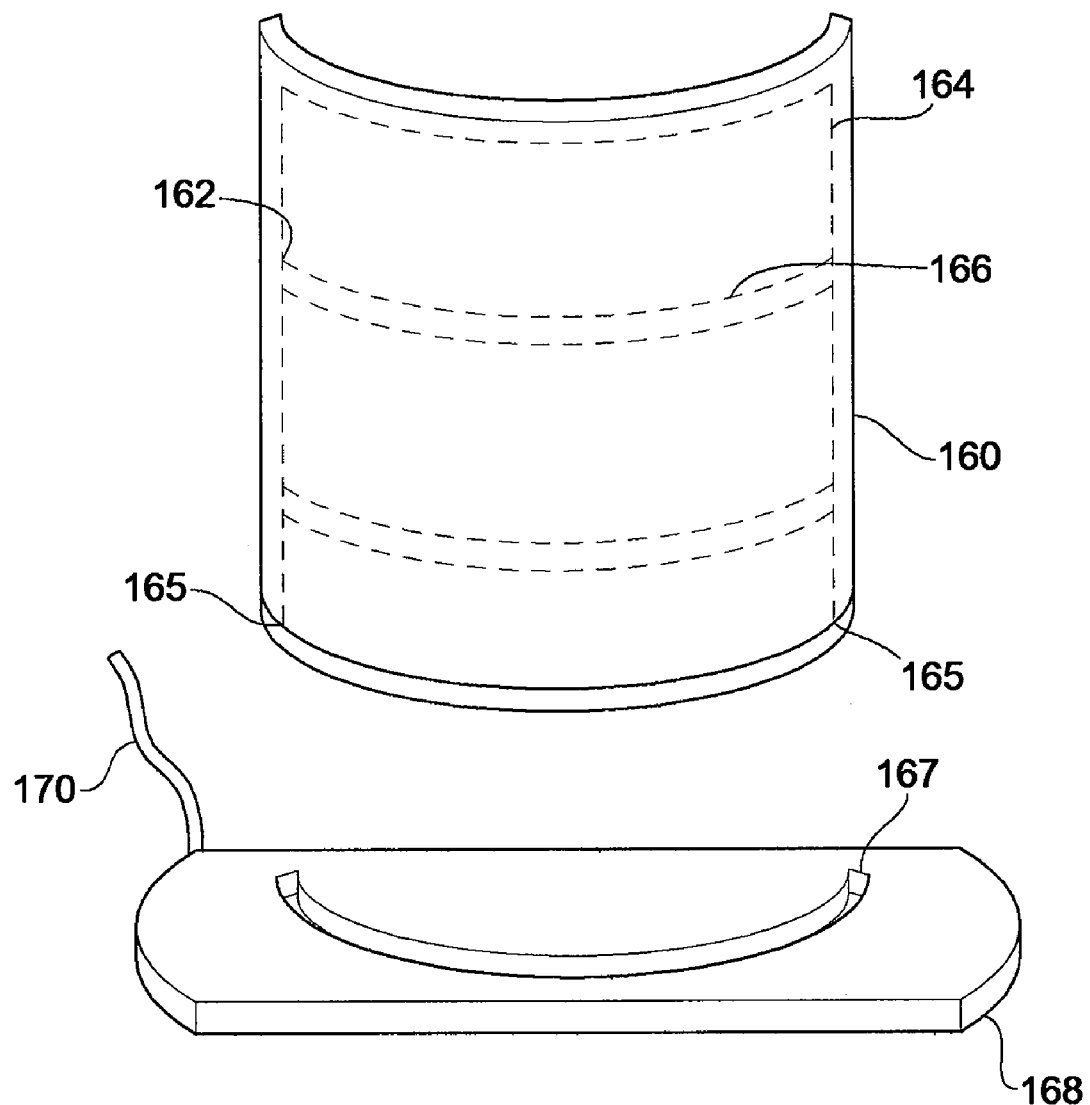
FIG. 4A is an illustration of an embodiment showing exemplary flexible display units with base, according to principles of the invention.
Figure 4B:
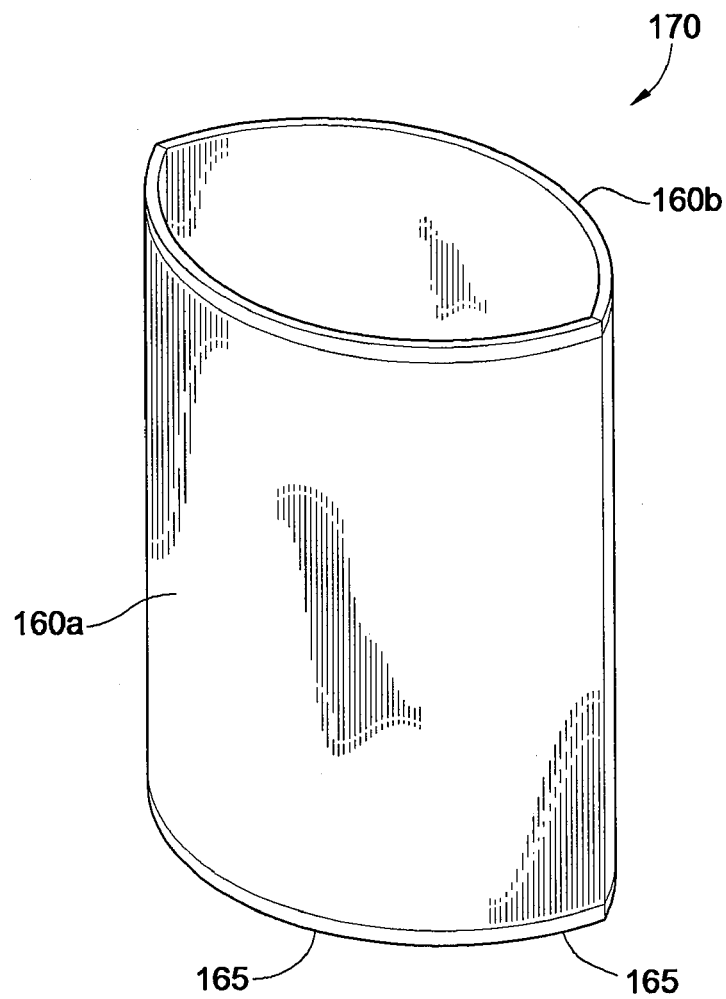
FIG. 4B is an illustration of an embodiment showing a pair of flexible display modules comprising a flexible display unit, according to principles of the invention.

Alternatively, computer complex 115 may control the flexible display unit 140 so that different sets of graphical displays are maintained separately at the same time, or nearly the same time, on different flexible display modules 160 that may comprise a flexible display unit 140, such as those shown in FIGS. 4A-D. In this way, different messages can be presented to viewers based on the directionality of one or more flexible display modules 160. For example, in the embodiment of flexible display unit 170 as shown in FIG. 4B (discussed more below), having two flexible display modules 160a and 160b, each portion the unit 170 (i.e., flexible display modules 160a and 160b) may display unrelated messages (or partially unrelated messages) thereby giving preferential treatment of message delivery based on viewing angle of the viewers. The computer complex 115 (FIG. 3) may drive each flexible display module 160a and 160b of FIG. 4A individually, either coordinating the messages between the two displays, or driving unrelated messages, as appropriate to the situation. The embodiment of FIG. 4B may be useful for example when two gaming consoles 100 are collocated, perhaps back to back, having a shared flexible display unit such as 170 with one set of messages targeted to viewers generally in front of one of the gaming consoles displayed by flexible display module 160a while the second set of messages may be targeted to viewers generally in front of the second gaming console and displayed by flexible display unit 160b.

Figure 2A:
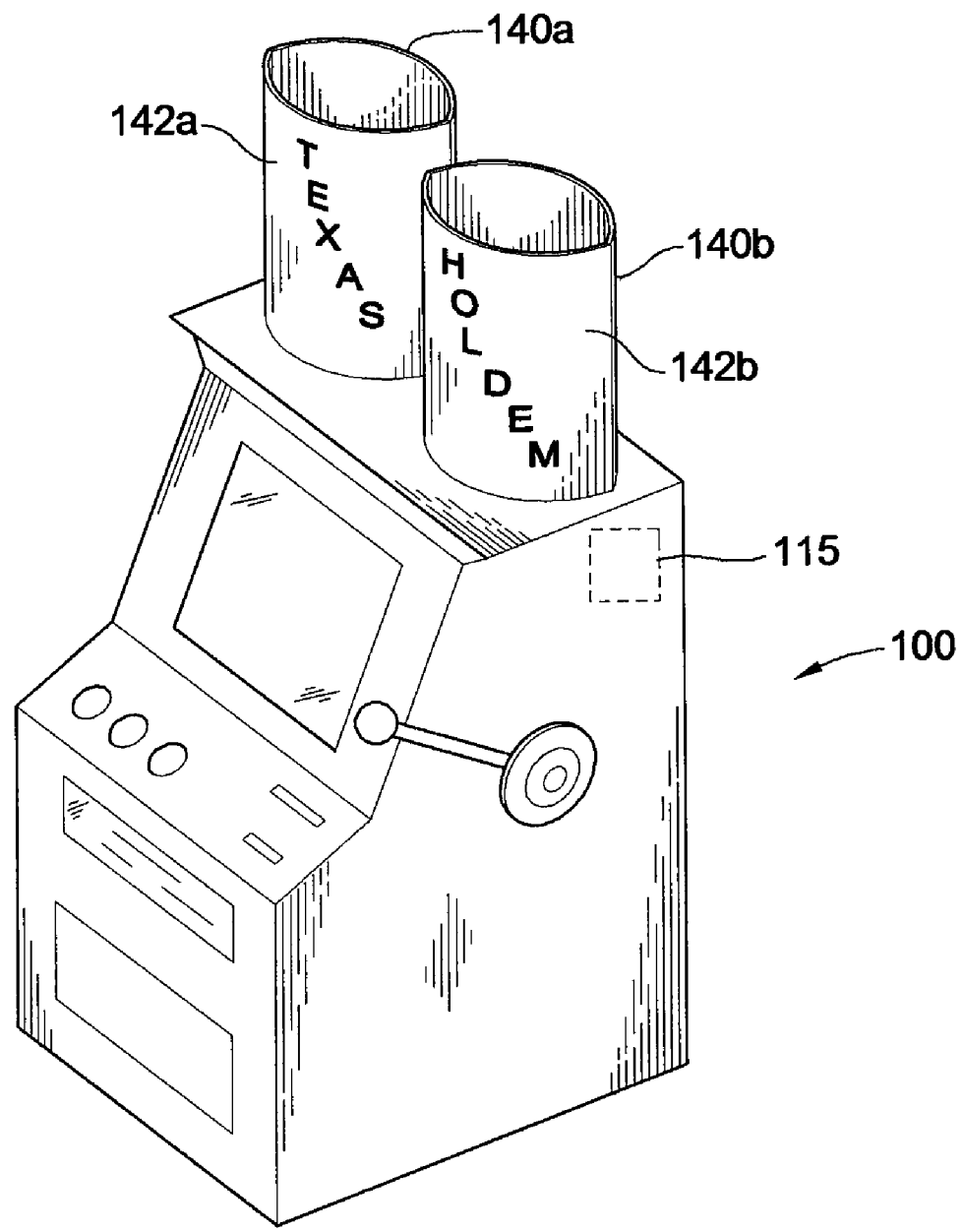
FIG. 2A is an illustration of an embodiment showing an exemplary gaming console with associated plurality of flexible display units, according to principles of the invention.
Figure 4C:
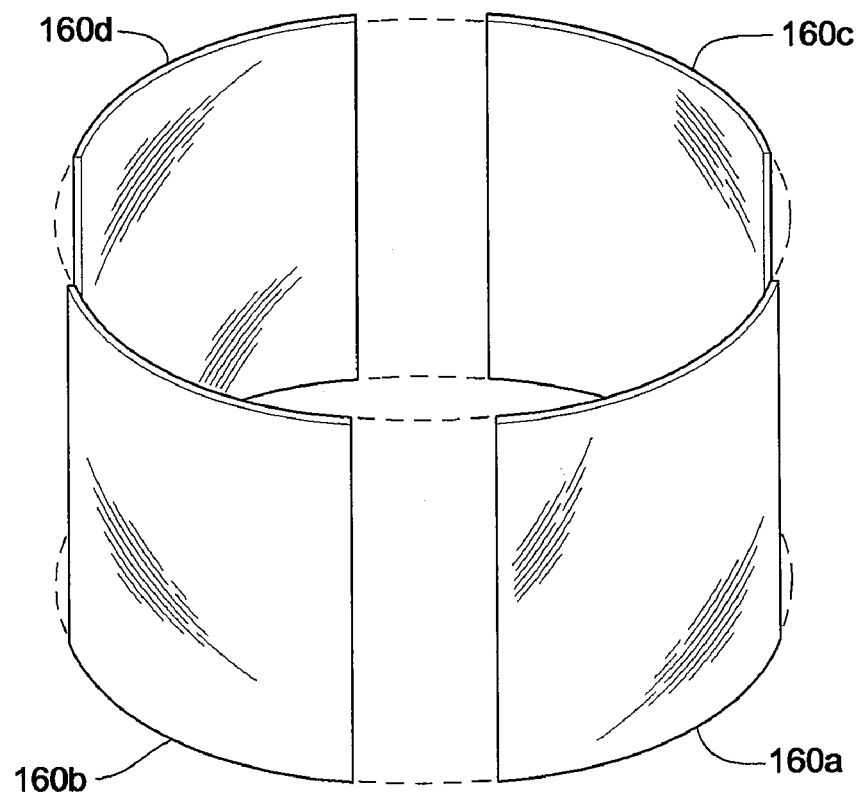
FIG. 4C is an illustration of an embodiment showing a plurality of flexible display modules comprising a flexible display unit, according to principles of the invention.

FIG. 2A is an illustration showing an exemplary gaming console 100 with associated plurality of auxiliary flexible display units 140a and 140b, according to principles of the invention. The flexible display units 140a and 140b may be driven so that the information displayed may appear to be coordinated between the two displays 140a and 140b, or each display 140a and 140b may be driven with unrelated messages or related messages such as messages 142a and 142b. Moreover, when the flexible display units 140a and 140b each comprise multiple flexible display modules (such as shown in FIG. 4B or 4C, for example), messages may be displayed directionally based on the orientation of each flexible display module. This results in a capability of displaying multiple related (or unrelated) messages simultaneously viewable from different directions, which may include substantially opposing directions, or expanded viewing angles as provided by the curvature of the flexible displays 160, as shown in FIG. 4A.

Flexible display units such as 140a and 140b of FIG. 2A may be used in real-time to complement the dynamic nature of wager-based games by using flashy animations and/or vibrant colors, such as pulsating messages or symbols, and "exploding" symbols or text (i.e. displays that grow in size on the display), as is well known in the art. Moreover, the messages may be controlled and coordinated so as to "reflect" from one display to another companion flexible display unit (such as 140a and 140b) providing a type of mirror image. Moreover, when used as a top box display, flexible display units such as 140a and 140b can be controlled by the computer complex for use during a game, and when triggered by an event related to the game, may result in a special message or display, for example, to indicate jackpots, bonus rounds or additional credit, and the like.

Figure 2B:
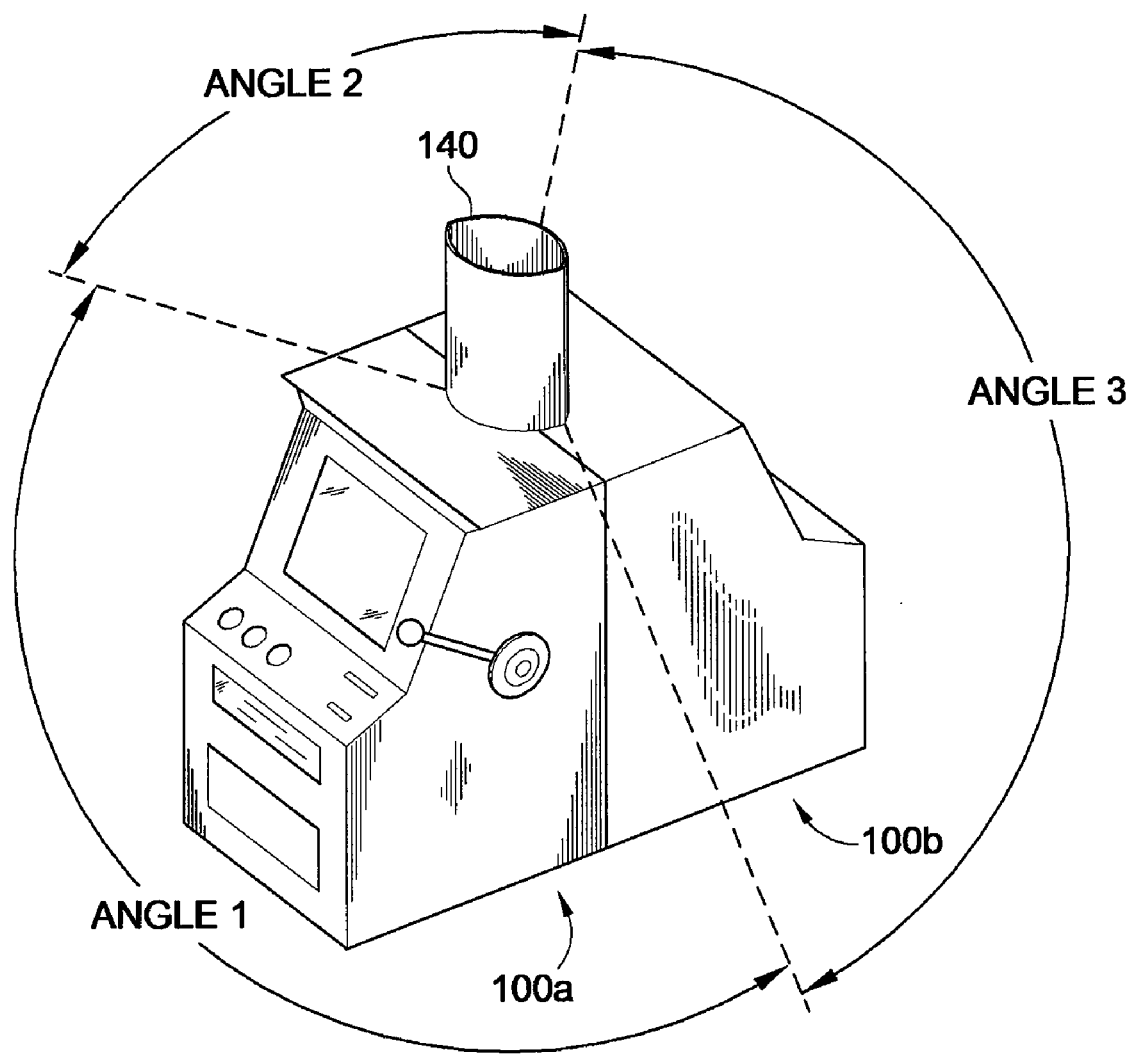
FIG. 2B is an illustration of an embodiment showing exemplary gaming consoles oriented back-to-back with a shared flexible display unit, according to principles of the invention.

FIG. 2B is an illustration showing exemplary gaming consoles 100a and 100b oriented generally in a back-to-back manner with a shared flexible display unit 140, according to principles of the invention. In a casino environment, back-to-back consoles 100a and 100b are often located between neighboring aisle ways in a casino and may have a display such as shared flexible display unit 140. Other types of consoles may also be arranged in this manner, such as ticket-vending kiosks and the like. In this example, flexible display unit 140 may have a separate electrical and signal connection to each respective console 100a or 100b, so each console may drive their own flexible display portion independently, e.g., separate flexible display modules such as 160a and 160b of FIG. 4B.

In certain embodiments, one console such as 100a in FIG. 2B may power and drive the entire flexible display unit 140 so that the unit 140 is driven to provide advertisements or general information perhaps related to other functions at the casino or facility operations (e.g., hotels, shows, restaurant, etc.). That is, the flexible display unit 140 may be driven without regard to any game being played on the gaming console, such as 100a or 100b. In this situation, computer complex 115 of the designated master console, such as 100a may be configured to drive pre-defined sections of the flexible display unit 140, which may be based on pre-defined directionality parameters. For example, parameters may be provided that define three corridors of viewability labeled in FIG. 2B as Angle1, Angle2 and Angle3. Nearly any number of corridors may be defined appropriate to a particular setting. Angle1 defines the field of view (a first corridor) for viewers generally in the front of or slightly laterally to gaming console 100a. Angle2 defines the field of view (a second corridor) for viewers located at the side of the gaming consoles 100a and 100b. Angle3 defines the field of view (a third corridor) for viewers generally located in front of or slightly laterally to gaming console 100b. In some embodiments, the designated master console may be downloaded with information supplied by a remote server either in real-time or the console may be pre-loaded. Optionally, a remote server may drive flexible display unit 140 directly, with or without corridor(s) of viewability parameters.

The embodiment depicted by FIG. 2B may also be useful when the pair of gaming consoles 100a and 100b may be situated at the end of an aisle so that an unobstructed view may be achieved from the side of gaming consoles 100a, 100b, for example. Once the relative directionality parameters of viewing corridors are defined, the computer complex 115 or a remote server can then drive the flexible display unit 140 as if there were three logically separate displays, with unrelated messages or graphics, if appropriate. Alternatively, graphics may be coordinated among the defined viewing corridors to create commonly presented graphics, which may include scrolling or shifting across each corridor in sequence. Also, two corridors of view may display a same graphic while the third may display an unrelated graphic. The defined corridors need not align with any one flexible display; rather, the corridor definitions may include parts of two or more flexible display modules, which are then managed by programming logic. In a preferred embodiment, a corridor would align with a flexible display module. The different corridors of view may be driven substantially simultaneously, with related or unrelated messages.

FIG. 3 is an illustration of an embodiment showing an exemplary gaming console with associated plurality of stacked auxiliary flexible display units, according to principles of the invention. Flexible display units 300a and 300b comprise a stacked array 305. Each flexible display unit 300a and 300b may comprise one or more flexible display modules. Each flexible display unit 300a and 300b, as well as individual display modules comprising display units 300a and 300b, may be driven independently so as to create visually unrelated messages, or the plurality of flexible display units 300a and 300b may be managed and coordinated so that a message or messages appear related or as part of the same message either when scrolled or flashed.

Moreover, stacked array 305 may have corridors of viewability assigned either as a unified stack or by partitioning the stack vertically and assigning unique corridors to each partition and driving each partition separately with its own corridor parameters. In this way, multiple viewing angles can be achieved with dynamically changing messages. For example, if the stack is defined to be two partitions (e.g., a top portion and a bottom portion corresponding to unit 300b and unit 300a respectively), then corridor parameters may be assigned independently to each partition. These defined corridors need not align by having the same defined viewing angles between the top and bottom portions. This may be especially useful when there are more numbers of corridors needed. Moreover, these corridor parameters may be established as sets of definitions that can change by time of day, or by situations related to the games being played. For example, when a jackpot occurs, all corridors may be temporarily (dynamically) redefined to react as one unified display to scroll or otherwise display indicia around the entire stack, for example. A top portion of a stack may have greater visibility to distributed persons in an area due to its height, and thus may be designated to display graphics intended for such viewing group, while the lower portion may be designated to display graphics that are related to that being implemented on the console.

FIG. 4A is an illustration of an embodiment showing an example of a flexible display unit with base according to principles of the invention. Flexible display unit 160 may have electrical and signal connections 165 such as edge connectors. Other types of electrical and/or signal connectors may be employed to convey power and/or to control the flexible display module 160, and other connector types are contemplated as required by the physical characteristics of commercially available flexible display modules.

In some embodiments, a plurality of flexible display modules 160 may be arranged to form a semi-circular and/or circular type of display with appropriate power and signal connections to each module as needed. To the extent flexible display unit 160 may be formed of a single flexible display module, a plurality of flexible display modules may be arranged to form a larger display unit. Information may be coordinated among the plurality of displays by a processor (such as computer complex 115) so that the information appears to be displayed by one unified unit. A base 168 may be employed to receive the flexible display unit 160. The base 168 may have electrical connectivity 167 such as to receive edge connectors 165, for example. The base 168 may have a bus or cabling 170 to convey power and signals as necessary such as to computer complex 115. Moreover, other types of bases and vertical structures may be employed as necessary to stabilize the flexible display structure and/or to create the desired curved effect. For example, a frame 162 may be provided to stabilize the flexible display module, and include members 164 positioned around or proximate a perimeter and members 166 positioned across a rear surface of the flexible display to prevent deformation and maintain structural integrity of flexible display unit 160.

FIG. 4B is an illustration of an embodiment showing a pair of flexible display modules comprising a flexible display unit 170, according to principles of the invention. Flexible display modules 160a and 160b may be arranged as one functional unit and oriented essentially opposed to one another so that opposed viewing angles can be achieved, or to achieve substantially different viewing angles. The curvature in the flexible display modules 160a and 160b may vary according to the flexibility of the panel employed and/or end use requirements. A suitable base (not shown) may be optionally provided for connecting the two flexible display modules 160a, 160b to a computer complex. A frame, similar to frame 162 in FIG. 4A may be employed for stabilizing the modules and/or to maintain structural integrity.

FIG. 4C is an illustration of an embodiment showing a plurality of flexible display modules comprising a substantially or generally cylindrical flexible display unit, according to principles of the invention. As shown in the exploded view, four flexible display modules 160a-160d may be configured so as to form a substantially complete cylinder. Greater or fewer numbers of flexible display modules may be employed, depending on the flexibility of the actual modules and/or the size of the cylinder desired. When arranged to form a cylinder, individual modules 160a-160d may be driven by a computer complex such as 115 or remote server (not shown) to create the impression of a monolithic display. Alternatively, each module 160a-160d may be driven as separate displays, such as with defined corridors. Electrical connectors are not shown in FIG. 4C, but electrical connectors are necessary to achieve power and signals and are assumed to be present.

Figure 4D:
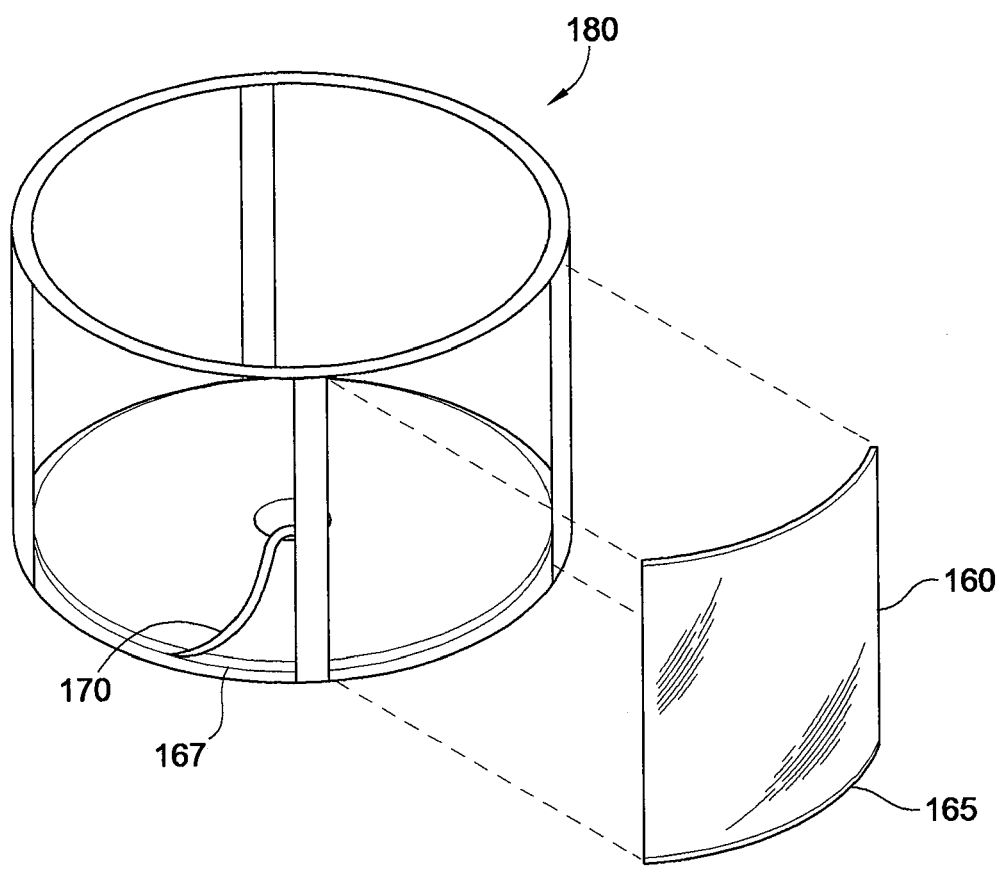
FIG. 4D is an illustration of an embodiment showing an exemplary frame to support one or more flexible display modules, according to principles of the invention.

FIG. 4D is an illustration of an embodiment showing an exemplary frame 180 to support one or more flexible display modules, according to principles of the invention. The exemplary frame 180 receives one or more flexible display modules 160 providing a relatively rigid structure for supporting the flexible display modules 160 thereby forming a flexible display unit. In certain embodiments, frame 180 may provide a receiving slot 167 for one or more of electrical connectivity and power, and a bus or cable 170 for connectivity to the computer complex 115 (shown in FIG. 3). Flexible display modules 160 may be affixed to the frame 180 by any suitable technique such as a bezel, clips, adhesives, or by any number of known connectors or connection means.

Figure 4E:
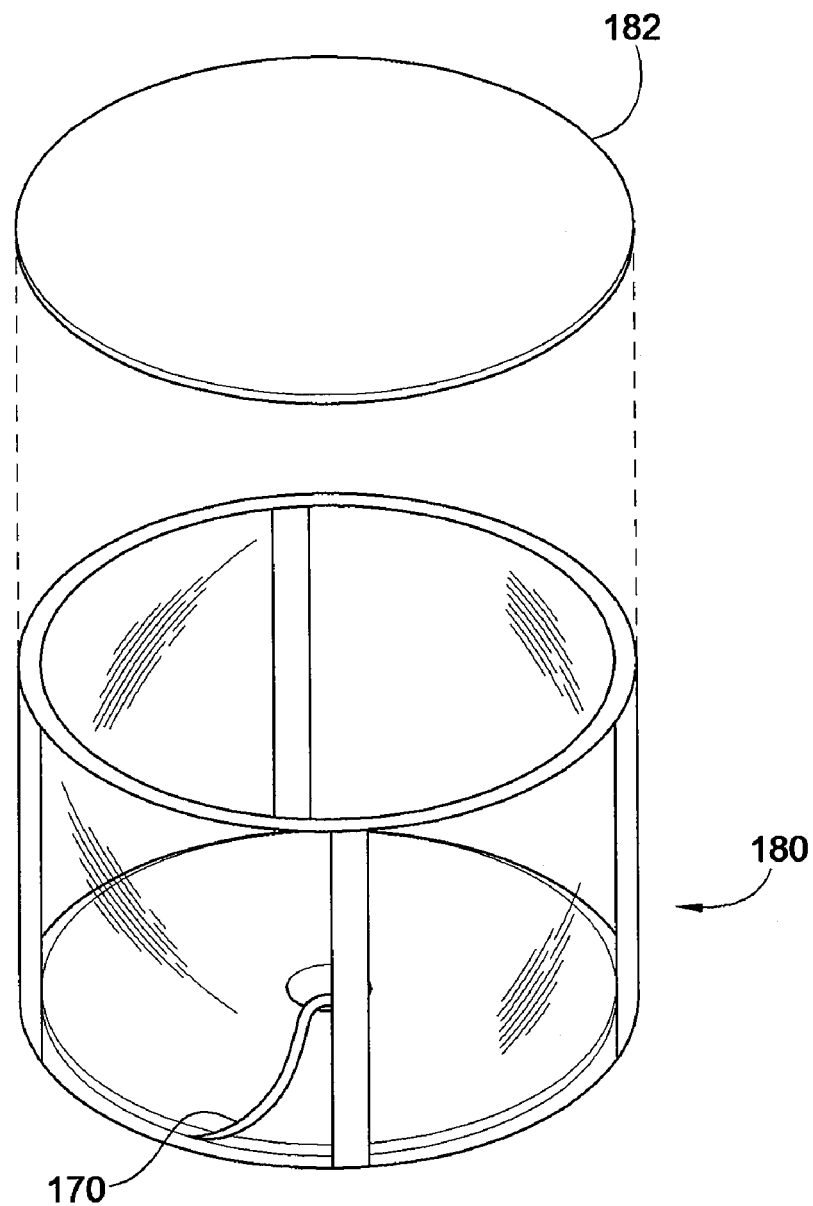
FIG. 4E is an illustration of an embodiment showing an exemplary frame to support one or more flexible display modules and an optional covering, according to principles of the invention.
Figure 4F:
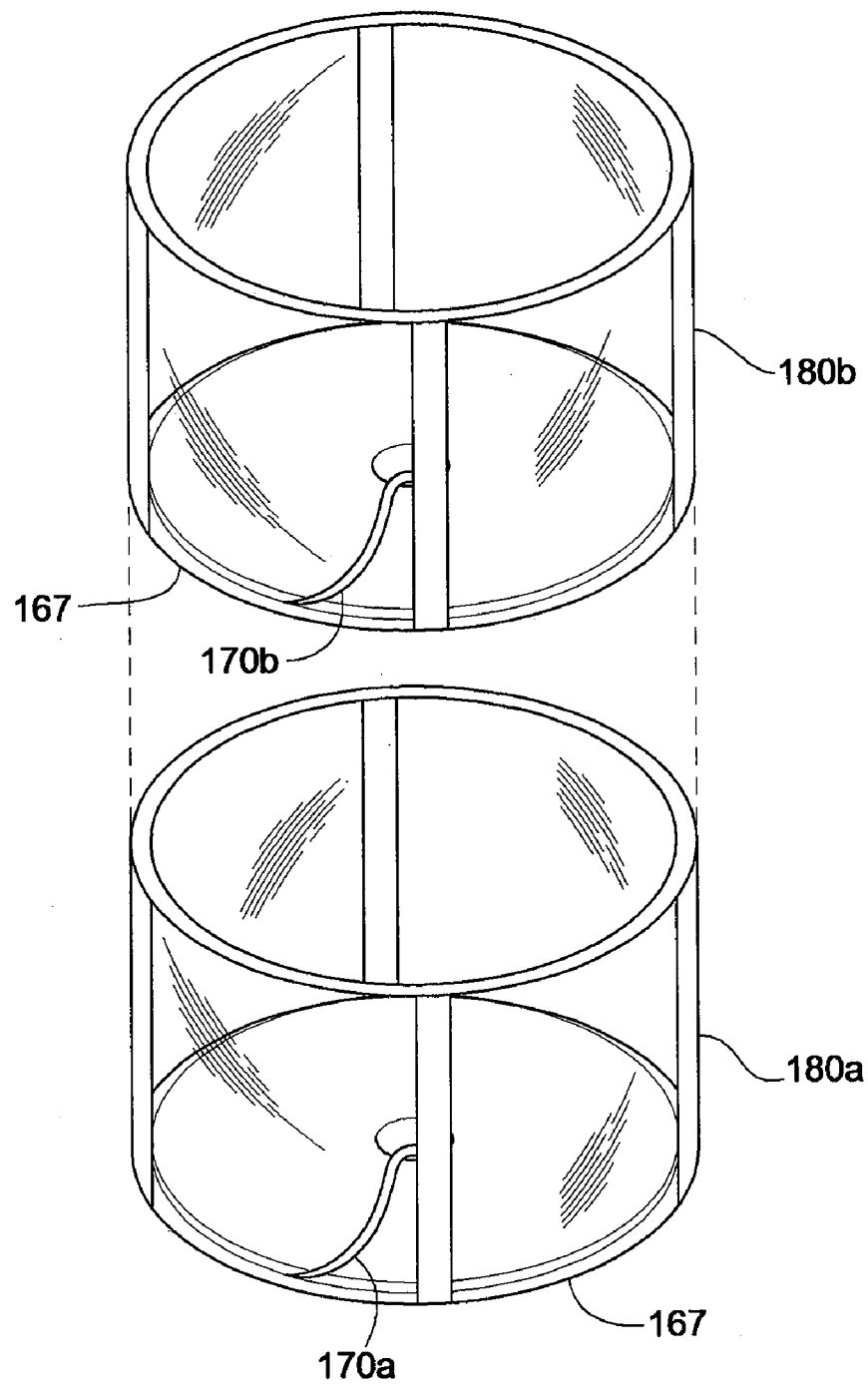
FIG. 4F is an illustration of an embodiment showing an exemplary stacked frame to support flexible display modules, according to principles of the invention.

FIG. 4E is an illustration of an embodiment showing an exemplary frame to support one or more flexible display modules and an optional covering 182, according to principles of the invention. FIG. 4F is an illustration of an embodiment showing an exemplary stacked frame to support flexible display modules, according to principles of the invention. The stacked frame comprises two frames 180a and 180b for supporting flexible display units. These frames may be independent and connected together as shown, or, alternatively, may be made as one integral unit. A separate bus or cable 170a and 170b for connectivity to the computer complex may be employed.

Figure 5:
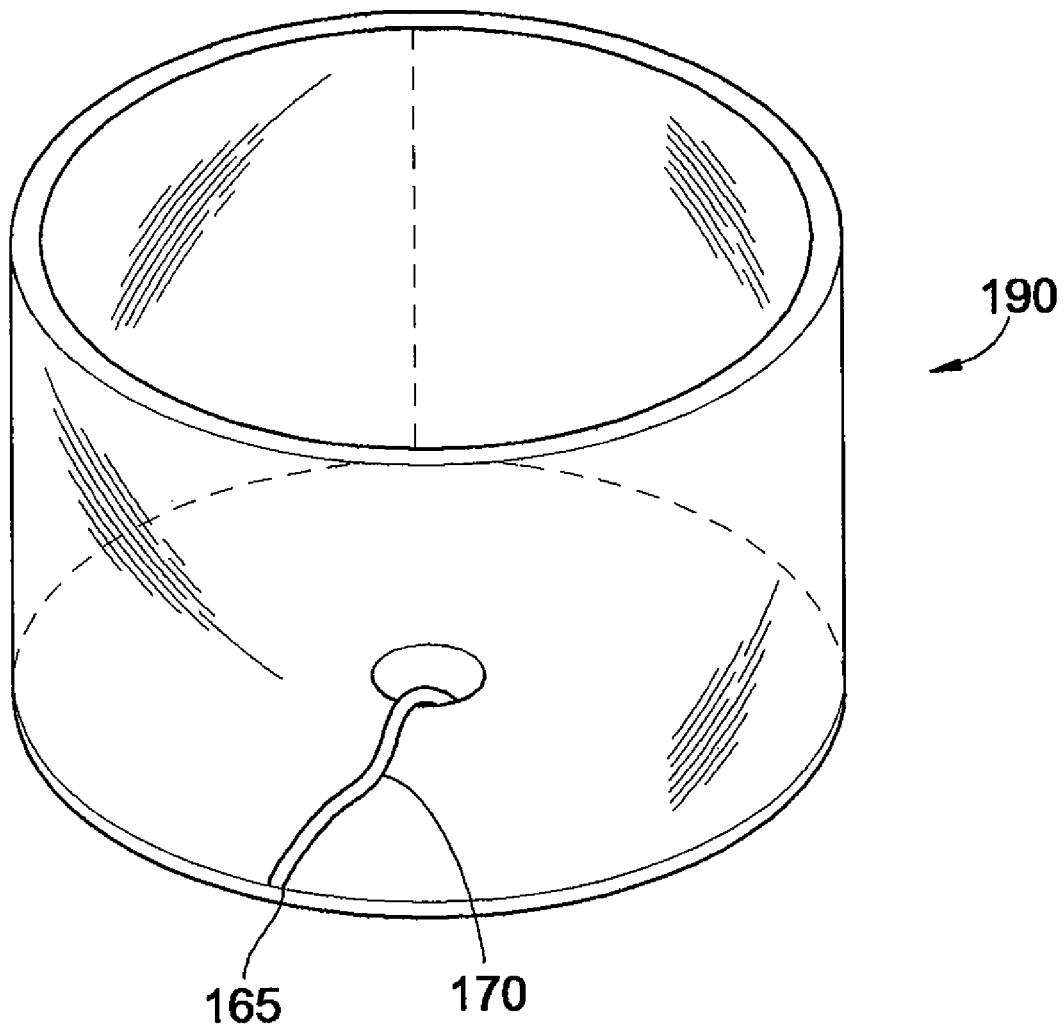
FIG. 5 is an illustration of an embodiment showing a flexible display module according to principles of the invention.

FIG. 5 is an illustration of an embodiment of a flexible display module that is substantially cylindrical in shape and made from one flexible display module, generally denoted as 190. When using a single flexible display module in this manner, corridor definition may be accomplished by virtual definition. That is, segments of the circular flexible display may be defined into one or more corridors and each corridor driven to display graphics as described above. The process for defining each corridor (essentially the angle of view) may be accomplished by virtually marking the boundaries of the corridors on the flexible display using software control in the computer complex to locate the boundaries of each corridor. This may be done by predefined spacing definition (database) or by using the gaming console 100 and controls such as 110a-110c to mark the corridor edges visually on the flexible display unit (typically after the gaming console and auxiliary flexible display 190 are installed). This can be done under software control by placing the software into a setup mode. When the edges of the corridor are visually located, the corridors are defined and the setup mode can be exited. Messages and graphics may then be displayed in the defined corridors as previously explained. That is, each defined corridor may be driven independently, either coordinated with corridor displays, or not coordinated.

Figure 6A:
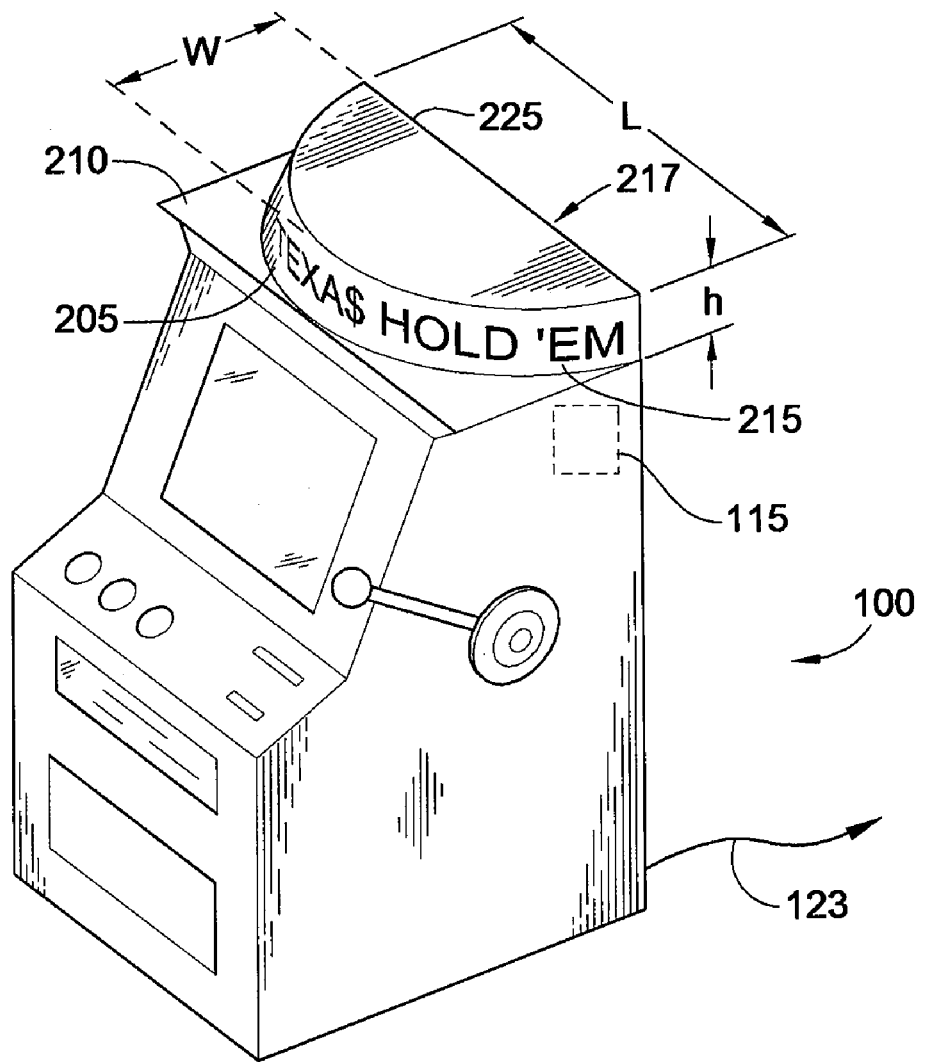
FIG. 6A is a perspective of an embodiment showing an exemplary gaming console with an associated flexible display unit, according to principles of the invention.
Figure 6B:
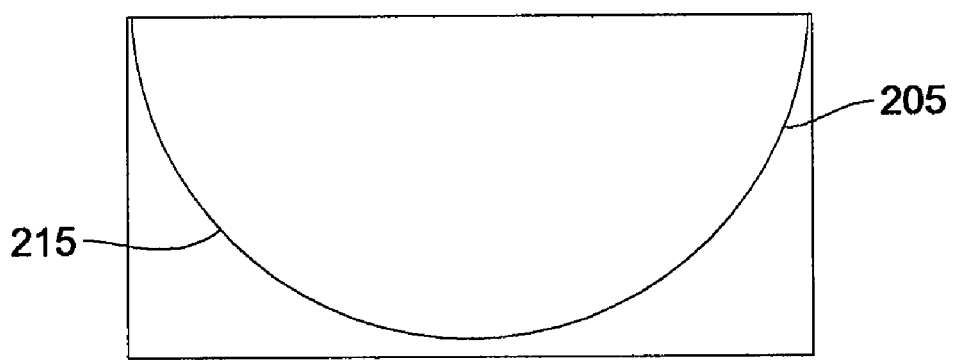
FIG. 6B is a top view of the associated flexible display unit of FIG. 6A, according to principles of the invention.

FIG. 6A is a perspective of an embodiment showing an exemplary gaming console with an associated flexible display assembly 217, according to principles of the invention, generally denoted as 100. The associated flexible display unit 205 is configured in a semi-circular fashion and is viewable from the front and either side of the gaming console 100. The associated flexible display assembly 217 has a length "L," a height "H," and a width "W". These dimensions may vary based on type of flexible display module(s) employed but are sized so that the assembly 217 is mountable on the top 210 of the gaming console. The front surface 215 of the flexible display assembly 217 is configured to be semi-circular in shape as shown more particularly by FIG. 6B.

The flexible display unit 205 may comprise one or more flexible display modules. If more than one flexible display module is employed, then the plurality of modules may be joined and managed so as to create one logical flexible display unit and driven as if it were one unit. Corridors may be defined in software as described previously.

In other embodiments, a flexible display module(s) may be mounted to provide a viewable display oriented so as to be viewable from above the gaming console (e.g., from a position substantially vertically above the gaming console). This may be useful in large multi-floor casinos (perhaps combined with a hotel) where guests may have the ability to look down on the gaming consoles or gaming floors prior to descending to the casino floor from higher floors.

In certain embodiments, the display 105, 205 may also include picture-in-picture (PIP) capability to present game related or non-game related information in a window displayed within the main display 105, 205. Moreover, the flexible display units (e.g., unit 140) may be driven so as to present PIP presentations, wherein the PIP display is managed to display a separate signal within the context of the flexible display unit display. The PIP signal display may be related to the game in progress on the game console.

Various modifications and variations of the described methods and systems of the invention will be apparent to those skilled in the art without departing from the scope and spirit of the invention. Although the invention has been described in connection with specific preferred embodiments, it should be understood that the invention as claimed should not be unduly limited to such specific embodiments. While a gaming console has been generally described, the invention could be used in other applications, such as, for example, a ticket kiosk. Indeed, various modifications of the described modes for carrying out the invention which are obvious to those skilled in the art are intended to be within the scope of the following claims.

What is claimed is:

1. A gaming console for implementing a wager-based game, comprising: a video display;
   a first flexible display unit having a display panel formed into a curved configuration;
   electronics configured to implement one or more services and configured to provide a video display signal to said video display and a flexible display signal to said first flexible display unit; and
   wherein said first flexible display unit displays an image in response to the received signal and wherein said flexible display unit provides a plurality of viewing corridors, wherein a field of view provided by said plurality of viewing corridors is approximately three hundred sixty degrees.

2. The gaming console of claim 1 wherein said first flexible display unit comprises a plurality of display modules.

3. The gaming console of claim 2, wherein each of said plurality of display modules independently receive said flexible display signal.

4. The gaming console of claim 3, wherein said plurality of display modules receive said flexible display signal in coordination with each other.

5. The gaming console of claim 1, wherein unrelated images are displayed in each viewing corridor.

6. The gaming console of claim 1, wherein said electronics further comprise a computer to produce said video display signal and said flexible display signal to transmit said flexible display signal to said flexible display unit and said video display signal to said video display.

7. The gaming console of claim 6, wherein said computer is in communication with a server to receive content for display on at least one of said video display and said first flexible display unit.

8. The gaming console of claim 1, wherein said first flexible display unit receives said signal from a server.

9. The gaming console of claim 1, further comprising a second flexible display unit.

10. The gaming console of claim 9, wherein said first and said second flexible display units display a coordinated message.

11. The gaming console of claim 1, wherein said flexible display unit is substantially semi-circular in shape.

12. The gaming console of claim 1, wherein said image is scrolled from said first viewing corridor to said second viewing corridor.

13. A gaming console for implementing a wager-based game, comprising: a gaming device having a video display and electronics configured to implement one or more wager-based games; and a flexible display unit having a display panel formed into a curved configuration associated with said gaming device, wherein said flexible display unit displays content and for facilitating viewing from different directions and wherein a field of view provided by said flexible display is approximately three hundred and sixty degrees.

14. The gaming console of claim 13, wherein said flexible display unit comprises at least one semi-circular display unit.

15. The gaming console of claim 13, wherein said flexible display unit comprises a substantially circular display unit.

16. The gaming console of claim 13, wherein said video display receives a video display signal and said flexible display unit receives a flexible display signal, wherein both said signals are produced by a common processor.

17. The gaming console of claim 13, wherein said content is scrolled for viewing from said different directions.

18. A method for displaying messages associated with a gaming console, said gaming console having a video display; an associated flexible display unit; electronics configured to implement one or more wager-based games and to produce signals to said video display and said flexible display unit, wherein said flexible display unit has a display panel formed into a curved configuration for displaying content and for facilitating viewing from different angles, said method comprising the steps of: defining a plurality of corridors of view for displaying content on said flexible display unit wherein a field of view provided by said plurality of corridors is approximately three hundred sixty degrees; and displaying content on said plurality of corridors of view, wherein the content includes one of information related to the gaming console and information related to operations unrelated to the gaming console.

19. The method of claim 18, wherein said step for defining defines a plurality of corridors of view; and said step for displaying content includes displaying content on said plurality of corridors of view substantially simultaneously.

20. The method of claim 18, wherein said step of displaying includes displaying an image which is scrolled on said two or more corridors.

* * * * *